United States Patent [19]
Danielewicz, Jr.

[11] 4,023,119
[45] May 10, 1977

[54] LASER OUTPUT COUPLER

[75] Inventor: Edward J. Danielewicz, Jr., Urbana, Ill.

[73] Assignee: University of Illinois Foundation, Urbana, Ill.

[22] Filed: Apr. 29, 1976

[21] Appl. No.: 681,425

[52] U.S. Cl. .......................... 331/94.5 C; 350/288
[51] Int. Cl.² .......................................... H01S 3/08
[58] Field of Search .......... 331/94.5; 350/288, 290, 350/292

[56] References Cited
UNITED STATES PATENTS

| | | | |
|---|---|---|---|
| 3,617,938 | 11/1971 | Denes et al. | 331/94.5 |
| 3,646,470 | 2/1972 | Tseng | 331/94.5 |

*Primary Examiner*—William L. Sikes
*Attorney, Agent, or Firm*—Martin Novack

[57] ABSTRACT

The invention pertains to a laser apparatus which includes a laser cavity containing a laser medium, such as methyl fluoride or formic acid, which has a characteristic wavelength in the far infrared region of the spectrum. The laser cavity has first and second opposing mirrors which also respectively serve as an input mirror for the pumping radiation and an output coupling mirror. The invention is an improved output coupler which serves as one of the first and second opposing mirrors. A metal layer having a multiplicity of apertures therein is provided. At least one layer of dielectric material is disposed over the metal layer. The dielectric material is selected to be substantially reflective of infrared radiation (at least 80% reflective) and substantially transmitting of far infrared radiation (at least 80% transmissive). The reflectivity of the output coupler to far infrared radiation is selected by choosing the aperture size and shape of the metal layer. Applicant has discovered that a quarter wave stack of layers of germanium and calcium fluoride provide a high degree of reflectance of the infrared pump radiation while being highly transmissive of the far infrared. Accordingly, these dielectric materials, in conjunction with a metallic grid of, for example, aluminum or nickel, provide a highly efficient output coupler.

16 Claims, 3 Drawing Figures

LASER OUTPUT COUPLER

BACKGROUND OF THE INVENTION

This invention relates to lasers and, more particularly, to an improved output mirror for far infrared lasers.

The invention described herein was made in the course of or under a contract or subcontract thereunder, with the Department of the Army.

Recently developed optically pumped far infrared lasers have produced numerous new laser lines in the spectral region from about 40 to 1800 microns. Optically pumped far infrared lasers have optical problems given rise to by the fact that the optics must simultaneously have certain desired properties as two widely separated infrared and far infrared wavelengths. For purposes of this application, the infrared portion of the spectrum is defined as the range of wavelengths between about 1–40 microns and the far infrared portion of the spectrum is defined as the range of wavelengths between about 40–1300 microns.

In a far infrared waveguide laser, a selected carbon dioxide laser line, typically around 10 microns wavelength, is focused through a hole in an input mirror into a waveguide resonator containing a gas to be pumped. To enhance efficiency, it is necessary that the pumping radiation reflect back and forth until it is fully absorbed by the gas. This requires that both mirrors at the ends of the laser cavity be highly reflective at the carbon dioxide laser wavelength. At the same time, the mirror which serves as the output mirror must be partially transmitting, to a desired degree, of the far infrared laser wavelength, to uniformly coupled out the far infrared resonator mode in a diffraction limited output beam. To applicant's knowledge, there has not heretofore been constructed an efficient mirror that will reflect substantially all of the radiation over the range of about 9.6 to 10.6 micron bands of the carbon dioxide pump laser, and partially transmit a specified fraction (typically 0 to 40%) of the radiation at the far infrared laser wavelengths.

Various types of high reflectance coatings have been utilized in optics for many years and it is known in the art that one can fabricate a reflecting mirror for the 10 micron wavelength by applying layers of certain dielectric materials on a semiconductor substrate. While this expedient is suitable for obtaining reflectance of the pump laser wavelength, this structure does not, in general, provide the desired partial reflectance at the far infrared wavelength.

Metal meshes or grids have been found to be good reflectors and partially transmitting mirrors for the far infrared. By varying the mesh spacing and mesh strip width relative to the wavelength, power reflectances between 0 and 100% can be achieved, as desired. These structures, however, do not provide the necessary high reflectance of the pump laser wavelength.

It is an object of the present invention to provide solution to the prior art problems as set forth.

SUMMARY OF THE INVENTION

The present invention is directed to a novel output mirror for a far infrared laser which is optically pumped by a wavelength in the infrared. Applicant has discovered that by fabricating a hybrid mirror structure which employs a metal mesh layer in conjunction with a dielectric layer, the favorable properties of almost total reflectance of certain infrared wavelengths is achieved while allowing a controlled degree of partial transmission of far infrared wavelengths. Applicant has determined that the combinations of these layers, when fabricated as set forth, provide overall favorable properties without mutually interfering with their intended functions.

In particular, the present invention pertains to a laser apparatus which includes a laser cavity containing a laser medium, such as methyl fluoride or formic acid, which has a characteristic wavelength in the far infrared region of the spectrum. The laser cavity has first and second opposing mirrors which also respectively serve as an input mirror for the pumping radiation and an output coupling mirror. The invention is an improved output coupler which serves as one of the first and second opposing mirrors. A metal layer having a multiplicty of apertures therein is provided. At least one layer of dielectric material is disposed over the metal layer. The dielectric material is selected to be substantially reflective of infrared radiation (at least 80% reflective) and substantially transmitting of far infrared radiation (at least 80% transmissive). The reflectivity of the output coupler to far infrared radiation is selected by choosing the aperture size and shape of the metal layer. Applicant has discovered that a quarter wave stack of layers of germanium and calcium fluoride provide a high degree of reflectance of the infrared pump radiation while being highly transmissive of the far infrared. Accordingly, these dielectric materials, in conjunction with a metallic grid of, for example, aluminum or nickel, provide a highly efficient output coupler.

Further features and advantages of the invention will become more readily apparent from the following detailed description when taken in conjunction with the accompanying drawings.

DESCRIPTION OF THE PREFERRED EMBODIMENT

Figure 1:
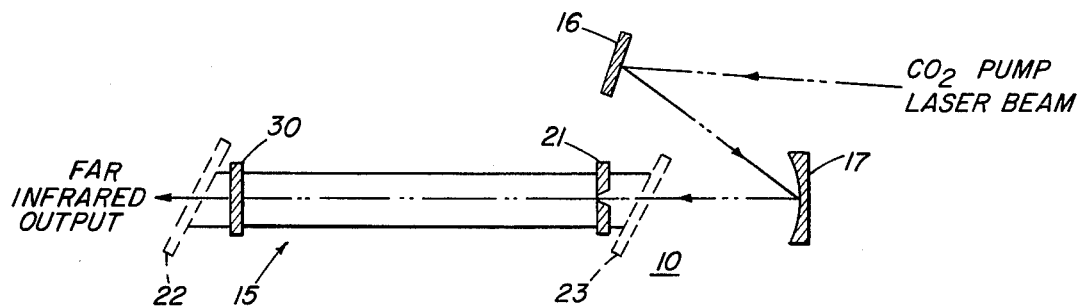
FIG. 1 is a schematic diagram of an optically pumped far infrared wave guide laser apparatus.

Referring to FIG. 1, there is shown a schematic diagram of an optically pumped far infrared waveguide laser apparatus 10. A laser cavity, generally defined at 15, contains gaseous laser medium, such as methyl fluoride, which has a characteristic emission wavelength at about 496 microns in the far infrared region of the spectrum. A selected $CO_2$ laser line, of about 10 microns wavelength, is directed by auxiliary mirror 16 and focusing mirror 17 through a hole in one end mirror 21. The mirror 21 may typically comprise a gold coated flat mirror having a 1.5 mm central hole. Suitable conventional vacuum seal windows, represented by reference numerals 22 and 23, are provided. For enhanced efficiency, it is desirable that the $CO_2$ laser radiation reflect back and forth in the cavity until it is fully absorbed by the gas medium. This requires that the output coupling mirror 30 be highly reflective at the $CO_2$ pumping laser wavelength. At the same time, the mirror 30 should ideally be partially transmitting (to a selected degree) at the far infrared laser wavelength, to uniformly couple out the far infrared resonator mode in a diffraction limited output beam.

Figure 2:
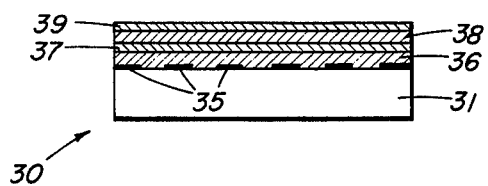
FIG. 2 is a cross-section of an outut coupler in accordance with an embodiment of the invention.
Figure 3:
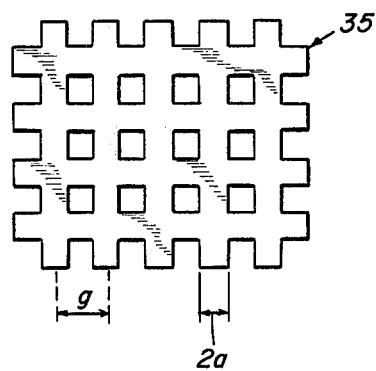
FIG. 3 illustrates one configuration of a metal grid utilized in an embodiment of the invention.

Referring to FIG. 2, there is shown a cross-section of an output coupling mirror 30 in accordance with the invention. A metal mesh or grid is deposited on a silicon substrate 31. One configuration of the grid is shown in FIG. 3. Deposited over the metal mesh 35 are layers of dielectric material, four layers being utilized in the present embodiment. The dielectric material selected should exhibit low absorption loss in the infrared and far infrared and preferably have good mechanical strength, adhesion, and resistance to atmospheric conditions and moisture. Applicant has discovered that a quarter wave stack of layers of low index $CaF_2$ and high index Ge meet these requirements. Alternating layers of calcium fluoride (reference numerals 36 and 38) and germanium (reference numerals 37 and 39) are shown in FIG. 2.

In one implementation of the invention, thin electroformed meshes obtained from Buckbee Mears Company were utilized as photomasks and a vacuum deposited layer of nickel metal was photolithographed using Shipley positive photoresist and a dilute nitric acid etch. In this implementation the silicon substrate utilized had a thickness of about 0.5 millimeters and the resultant metal mesh thickness was about 0.5 microns. The dimensions $g$ and $a$ (FIG. 3) were 50.3 microns and 5.6 microns, respectively, resulting in a reflectivity of about 85%. The thin films of dielectric material, 36–39, were deposited by vacuum evaporation at pressures in the range $10^{-5}$ to $10^{-6}$ torr. The Ge used for the evaporations consisted of N-type single crystal chips with a resistivity of about 25 ohm centimeters. Reagent grade $CaF_2$ powder, supplied by Allied Chemical Corp., was utilized as a source of $CaF_2$. During evaporation, a tungsten boat was used for the Ge and a molybdenum boat was used for the $CaF_2$. Quarter wave film thicknesses were 0.60 microns for the Ge and 2.25 microns for the $CaF_2$ in this implementation.

The disclosed output coupling mirror implementation was utilized in a far infrared waveguide laser apparatus of the type shown in FIG. 1. The waveguide was laboratory grade Pyrex tubing 120 cm. long and of 22 mm. inner diameter. The pump radiation from a continuous wave $CO_2$ laser was focused into the laser cavity with a 30 cm. focal length lens. At the optimum pressure of 34 millitorr with 7.6 watts of $CO_2$ pump power a far infrared output power of 3 milliwatts was obtained. This far infrared power was a factor of 350 times larger than that obtained with the same system utilizing a 1.5 mm diameter hole output coupler.

The invention has been described with reference to a particular embodiment, but variations within the spirit and scope of the invention will occur to those skilled in the art. For example, it will be understood that alternate grid or mesh configurations could be utilized.

I claim:

1. In a far infrared laser apparatus comprising a laser cavity, a lasing medium disposed in said cavity, first and second opposing reflecting surfaces, and means for introducing a beam of pumping infrared radiation; an improved output coupler serving as one of said first and second opposing surfaces, comprising:
   a metal layer having a multiplicity of apertures therein; and
   at least one layer of dielectric material disposed over said metal layer, said dielectric material being selected to be substantially reflective of infrared radiation and substantially transmitting of far infrared radiation.

2. The apparatus as defined by claim 1 wherein said at least one dielectric layer comprises a germanium layer.

3. The apparatus as defined by claim 1 wherein said at least one dielectric layer comprises a calcium fluoride layer.

4. The apparatus as defined by claim 1 wherein said dielectric layer comprises a layer of germanium and a layer of calcium fluoride.

5. The apparatus as defined by claim 4 wherein said semiconductor layer comprises alternating layers of germanium and calcium fluoride.

6. The apparatus as defined by claim 5 wherein said layers comprise a quarter wave stack at the pumping radiation wavelength.

7. The apparatus as defined by claim 1 wherein said metal layer comprises a metallic grid.

8. Apparatus as defined by claim 5 wherein said metal layer is deposited on a silicon substrate.

9. Apparatus as defined by claim 5 wherein said first reflecting surface comprises an input mirror having an aperture therein.

10. Apparatus as defined by claim 5 wherein said metal layer is formed of nickel.

11. An output coupler for a far infrared laser, comprising:
    a metal layer having a multiplicity of apertures therein; and
    at least one layer of dielectric material disposed over said metal layer, said dielectric material being selected to be substantially reflective of infrared radiation and substantially transmitting of far infrared radiation.

12. The output coupler as defined by claim 11 wherein said at least one dielectric layer comprises a germanium layer.

13. The output coupler as defined by claim 11 wherein said dielectric layer comprises a layer of germanium and a layer of calcium fluoride.

14. The output coupler as defined by claim 11 wherein said dielectric layer comprises alternating layers of germanium and calcium fluoride.

15. The output coupler as defined by claim 14 wherein said layers comprise a quarter wave stack at the wavelength of pumping radiation to be utilized.

16. The output coupler as define by claim 11 wherein said metal layer comprises a metallic grid.

* * * * *